April 19, 1949. I. PARGMAN 2,467,630
ELECTRIC VAPORIZER
Filed Nov. 1, 1946

INVENTOR.
I. PARGMAN
BY J. Ledermann
ATTORNEY

Patented Apr. 19, 1949

2,467,630

UNITED STATES PATENT OFFICE 2,467,630

ELECTRIC VAPORIZER

Isaac Pargman, Paterson, N. J.

Application November 1, 1946, Serial No. 707,256

4 Claims. (Cl. 219—40)

1

This invention relates to electric vaporizers of the type used in the treatment of colds, and aims to provide a novel and practical electric vaporizer by means of which a flow of medicated steam may be obtained in a very brief interval of time after energizing the electric heating circuit with the device immersed in water. A feature of the invention is that the vaporizer functions by being immersed in a vessel or container, such as, for instance, a pail, containing water, and it may therefore function continuously for a long period of time such as, say, all night or for twenty four hours, as long as there is water in the vessel. Moreover, this feature of the device results in the elimination of a jar of fragile material such as forms part of common types of vaporizers and which is subject to breaking.

Another object of the invention is the provision of means for adjustably suspending the vaporizer in the water from the rim of the vessel, and by means of this feature the intensity of the jet of steam may be varied as desired.

The above as well as additional and more detailed objects will become apparent in the following description wherein characters of reference refer to like-numbered parts in the accompanying drawing. It is to be noted that the drawing is intended for the purpose of illustration only and that it is neither desired nor intended to limit the invention to any or all of the specific details of construction shown excepting insofar as they may be deemed essential to the invention.

Referring briefly to the drawing.

Figure 2:
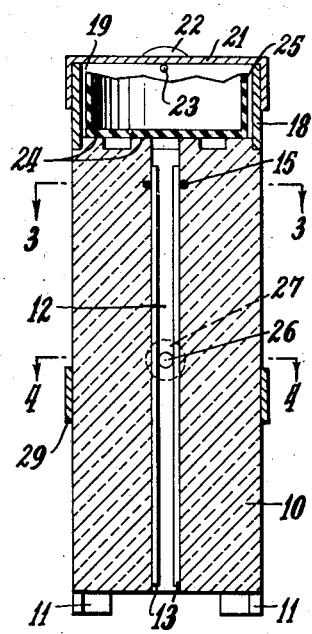
Fig. 2 is a sectional view of the vaporizer taken on the line 2—2 of Fig. 1.
Figure 1:
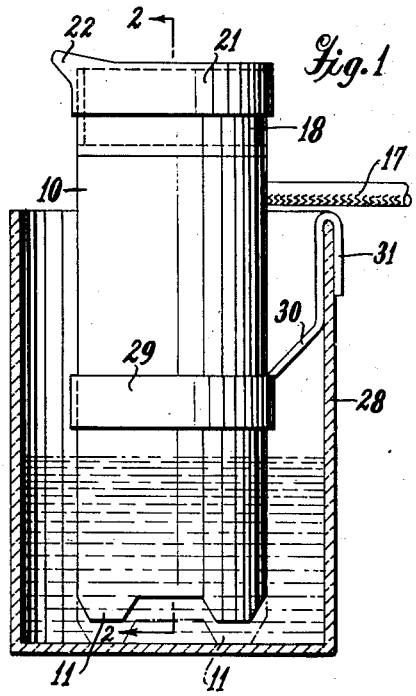
Fig. 1 is a side elevational view of the vaporizer mounted in a vessel containing water, the vessel being shown in cross-section.
Figure 3:
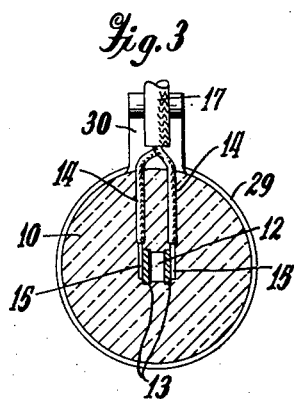
Fig. 3 is a sectional view taken on the line 3—3 of Fig. 2.
Figure 4:
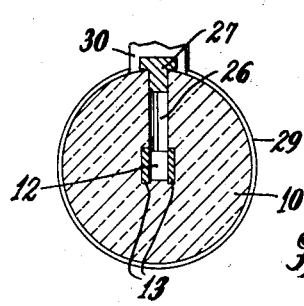
Fig. 4 is a sectional view taken on the line 4—4 of Fig. 2.
Figure 5:
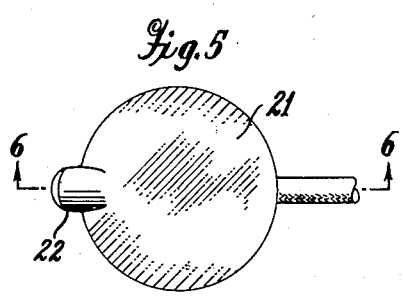
Fig. 5 is a plan view of the vaporizer.
Figure 6:
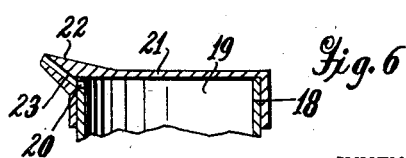
Fig. 6 is a fragmentary sectional view taken on the line 6—6 of Fig. 5.

Referring in detail to the drawing, the numeral 10 indicates a cylindrical body, which may be substantially solid and made of porcelain cement, or the like, as shown, or of any other desired construction. Any means may be provided to give access to the bottom of the body 10 when it is standing on a surface, such as, for instance, legs 11.

A longitudinal channel 12, which is preferably rectangular in cross-section, extends entirely through the body 10 from top to bottom. Imbedded in opposed walls of the channel 12, are conductor plates or electrodes 13, which may be made of copper. Insulated electric conductors or wires 14, having their bare extremities 15 soldered or otherwise attached to the electrodes 13, extend through the body 10 to the outside, where they are carried in a common two-conductor sheath 17, at the free extremity of which an electric plug, not shown, would be provided for plugging into a socket.

A flange 18, which may be of metal or any other desired material, is secured to the top of the body 10, thereby providing a chamber 19 therewithin. A hole 20 is provided through the flange 18. A cap 21 having a nozzle 22 whose opening 23 passes through the flange, is adapted to register upon and close the flange. It is apparent that when the holes 20 and 23 are aligned, an exit is provided from the chamber 19 into the air, and when the cap is rotated to bring these holes out of alignment that exit is closed.

The upper surface of the body 10 may be made irregular in any desired manner, as, for instance, by upward projections 24, upon which a cup 25, which may be made of any suitable material such as, for instance, paper, may be placed, and the medicament to be used, not shown, is placed in the cup.

Intermediate the height of the body 10, a passage 26 is provided through one side of the body into the channel 12, and this passage is normally closed by a removable plug 27.

A cradle is provided for suspending the body 10 from the rim of a vessel containing water, such as is shown at 28. A cylindrical band or the like 29, snugly but frictionally fits about the body 10 in such a manner that the body may be slid upward or downward with respect to the band yet the friction of the band about the body will maintain the body in any position into which it is thus slid. An arm 30 extends upward from the band 29 and has its extremity shaped into a hook 31 adapted to grip the rim of the vessel and thereby suspend the body 10 therefrom.

As the body is immersed into water, for instance by setting it down without the cradle on the bottom of the vessel on its legs 11, water will rise in the channel 12 up to the level of water in the vessel. With the electric current on, the water between the electrodes 13 will be very rapidly heated and transformed into steam. The steam will rise into the chamber 19 and mix with the medicament in the cup 25, and issue from the nozzle 22, when the holes 20 and 23 are aligned, in the form of medicated steam. If the jet of medicated steam is too intense, it may be reduced by lifting the body 10 upward in its cradle, thereby reducing the amount or height of water within the channel 12 and hence reducing the rate at which steam is provided. The reverse procedure increases the intensity of the jet.

The ordinary vaporizer utilizes a jar in which the heater element is contained, and the jar will receive only a small or limited amount of water, thus necessitating frequent additions of water when the device is to be used for any length of time. In the case of this invention, it is apparent that a very large quantity of water is available, so that the vaporizer may be kept functioning for a very long period of time without requiring any addition of water.

If the cap 21 is put on, or rotated, to disalign the holes 20 and 23, and the plug 27 is removed, the steam formed in the device will issue through the opening 26 into the body of water contained in the vessel, thereby rapidly heating that water. Thus, the device may be used as a water heater, to provide a vessel or container of hot water when desired.

Obviously, modifications in form and structure may be made without departing from the spirit and scope of the invention.

I claim:

1. An electric vaporizer comprising a substantially cylindrical upright solid body of insulating material adapted to be set into a vessel containing water, said body having a longitudinal axial channel therethrough of relatively very small diameter compared with the diameter of said body, said channel having opposed electrodes mounted in the sides thereof, electrical conductors secured to said electrodes and passing out through said body, said body having a flange around the top thereof enclosing a chamber, and a cap registerable about said flange to close the top of the flange.

2. The device set forth in claim 1, said body having an opening through one side thereof into said channel.

3. The device set forth in claim 1, having, in combination with a vessel to contain water, means for slidably suspending said body from the rim of the vessel.

4. The device set forth in claim 1, having a band frictionally and slidably surrounding the body, said band having an arm extending upward therefrom, said arm having a hook on its upper extremity adapted to engage the rim of a vessel and thereby suspend said body slidably from said rim.

ISAAC PARGMAN.

REFERENCES CITED

The following references are of record in the file of this patent:

UNITED STATES PATENTS

| Number | Name | Date |
| --- | --- | --- |
| 1,950,577 | Stephenson | Mar. 13, 1934 |
| 2,347,825 | Hanks | May 2, 1944 |
| 2,387,155 | Katzman | Oct. 16, 1945 |